(12) United States Patent
Schüssler

(10) Patent No.: US 12,345,563 B2
(45) Date of Patent: Jul. 1, 2025

(54) METHOD AND APPARATUS FOR INTERFEROMETRIC VIBRATION MEASUREMENT AT A PLURALITY OF MEASUREMENT POINTS BY MEANS OF A MEASURING LASER BEAM

(71) Applicant: Polytec GmbH, Waldbronn (DE)

(72) Inventor: Matthias Schüssler, Waldbronn (DE)

(73) Assignee: Polytec GmbH, Waldbronn (DE)

( * ) Notice: Subject to any disclaimer, the term of this patent is extended or adjusted under 35 U.S.C. 154(b) by 434 days.

(21) Appl. No.: 17/442,839

(22) PCT Filed: Mar. 9, 2020

(86) PCT No.: PCT/EP2020/056147
§ 371 (c)(1),
(2) Date: Sep. 24, 2021

(87) PCT Pub. No.: WO2020/193105
PCT Pub. Date: Oct. 1, 2020

(65) Prior Publication Data
US 2022/0187120 A1  Jun. 16, 2022

(30) Foreign Application Priority Data
Mar. 28, 2019  (DE) .......................... 102019108124.6

(51) Int. Cl.
*G01H 9/00*  (2006.01)
(52) U.S. Cl.
CPC ..................... *G01H 9/00* (2013.01)
(58) Field of Classification Search
CPC ..................... G01H 9/00; G01P 3/36
See application file for complete search history.

(56) References Cited

U.S. PATENT DOCUMENTS 7,623,221 B2 * 11/2009 Thun ..................... G01S 7/4865
356/5.1
9,077,137 B2 * 7/2015 Rowlette ............. H01S 5/02208
2024/0416453 A1 * 12/2024 Yokoyama ........... B23K 26/032

FOREIGN PATENT DOCUMENTS

DE  202018104050      9/2018
JP  2015203592 A  * 11/2015
WO  WO-2015133691 A1 *  9/2015 ............... G01H 9/00

OTHER PUBLICATIONS

EPO Machine translation of JP 2015-203592 A (generated on Nov. 16, 2023) (Year: 2015).*

(Continued)

*Primary Examiner* — Judy Nguyen
*Assistant Examiner* — James Split
(74) *Attorney, Agent, or Firm* — Volpe Koenig

(57) ABSTRACT

A method for interferometric vibration measurement at a plurality of measurement points using a measuring laser beam, including A. generating the measuring laser beam having a wavelength in the infrared wavelength range and a pilot laser beam having a wavelength in the visible wavelength range; B. deflecting the measuring laser beam and the pilot, laser beam by a common optical deflection unit, and controlling the deflection unit such that the pilot laser beam is incident on the measurement point; and C. carrying out a vibration measurement using the measuring laser beam. An angular deviation between the pilot laser beam and the measuring laser beam is determined and, in a correction step B1, between method step B and C, the deflection unit is actuated in order to compensate for the angular deviation between the pilot laser beam and the measuring laser beam.

15 Claims, 5 Drawing Sheets

(56) References Cited

OTHER PUBLICATIONS

Opg. "How to align an invisible laser beam", (Oct. 18, 2013), Retrieved from the Internet: https://web.archive.org/web/20131018051045Uhttp://www.ophiropt.com/user_files/laser/power_meters/Tech-Tip-How-to-align-an-invisible-laser-beam.pdf,[retrieved on Jun. 4, 2020], XP055701359, p. 2-p. 4, Oct. 18, 2013.

Wiedner et al. "Price List Aug. 2014 Laser Diodes—UV Laser Diodes—Blue", (Nov. 1, 2014), Retrieved from the Internet: http://www.roithner-laser.com/pricelist.pdf [retrieved on Nov. 25, 2014] XP055155072, Infrared Sensor cards; p. 132-p. 133, Nov. 1, 2014.

Ophir—An MKS Brand. "How to Align an Invisible Laser Beam", (Aug. 26, 2015), pp. 1-2, Retrieved from the Internet: https://www.youtube.com/watch?v=cKQEgwUSejY [retrieved on Jun. 5, 2020] XP0549 80526 minutes: 0:34, 0:37, 0:52, 1:50, Aug. 26, 2015.

* cited by examiner

METHOD AND APPARATUS FOR INTERFEROMETRIC VIBRATION MEASUREMENT AT A PLURALITY OF MEASUREMENT POINTS BY MEANS OF A MEASURING LASER BEAM

TECHNICAL FIELD

The invention relates to a method and an apparatus for interferometric vibration measurement at a multiplicity of measurement points.

BACKGROUND

For vibration measurement at a multiplicity of measurement points on a measurement object, apparatuses in which a laser beam generated by a laser beam source is split into a measurement laser beam and a reference laser beam are known. The measurement laser beam is directed onto the measurement points successively by a deflection unit. The measurement laser beam at least partially reflected and/or scattered at the object is superimposed with the reference laser beam on a detector surface of a detector in order to form optical interference. Vibration data, in particular a speed of movement of the object at the measurement point, may be deduced from the measurement signals of the detector. Typically, the deflection unit is configured so that the measurement laser beam can be deflected in 2 directions.

In this case, apparatuses in which the wavelength of the measurement laser beam lies in the infrared wavelength range are known. This has the disadvantage that the point of incidence of the measurement laser beam on the measurement object is generally not visible to the user. Apparatuses in which a pilot laser beam is additionally coupled into the beam path of the measurement laser beam before the deflection unit are therefore known. The wavelength of the pilot laser beam lies in the visible wavelength range, so that the user can deduce the point of incidence of the measurement laser beam with the aid of the point of incidence of the pilot laser beam on the measurement object.

It is a problem that inaccuracies occur even after fine adjustment of the optical elements for coupling the pilot laser beam into the beam path of the measurement laser beam. Typically, there is at least a small angular deviation between the measurement laser beam and the pilot laser beam. The point of incidence, which is visible to the user, of the pilot laser beam on the measurement object therefore typically deviates at least slightly (in the range of a few µm) from the point of incidence of the measurement laser beam.

This inaccuracy is relevant in particular when (a) the measurement laser beam needs to be aligned with intricate structures, or (b) so-called in-plane vibrations are deduced, that is to say vibration components approximately perpendicular to the direction of incidence of the measurement laser beams on the object are calculated, from the vibration data of a multiplicity of measurement beams, in particular when using an apparatus having a plurality of measurement heads, each measurement head being configured to emit at least one measurement beam and comprising at least one deflection unit. Particularly in the case of such evaluations, even minor location inaccuracies lead to significant errors in the evaluation.

SUMMARY

The object of the present invention is therefore to reduce inaccuracies due to a location difference of the points of incidence of the pilot laser beam and measurement laser beam on the measurement object.

This object is achieved by a method and by an apparatus having one or more of the features disclosed herein. Advantageous configurations may be found below and in the claims.

The apparatus according to the invention is preferably configured to carry out the method according to the invention, in particular a preferred embodiment thereof. The method according to the invention is preferably configured to be carried out by the apparatus according to the invention, in particular a preferred embodiment thereof.

The method according to the invention for interferometric vibration measurement at a multiplicity of measurement points using a measurement laser beam comprises the following method steps:

In a method step A, the measurement laser beam with a wavelength in the infrared wavelength range and a pilot laser beam with a wavelength in the visible wavelength range are generated. In a method step B, the measurement laser beam and the pilot laser beam are deflected by a common optical deflection unit, and the deflection unit is controlled so that the pilot laser beam impinges on the measurement point. In a method step C, a vibration measurement is carried out using the measurement laser beam.

The invention is based on the discovery by the Applicant that, on the one hand, a location deviation between the points of incidence of the pilot laser beam and of the measurement laser beam cannot be fully avoided by adjustment of optical components. On the other hand, providing the user with the possibility of carrying out its own readjustment of optical components is complicated. According to the invention, an angular deviation between the pilot laser beam and the measurement laser beam is therefore determined and compensated for before carrying out the vibration measurement:

In the method according to the invention, an angular deviation between the pilot laser beam and the measurement laser beam is therefore determined, and, in a correction step B1 between method steps B and C, the deflection unit is actuated in order to compensate for the angular deviation between the pilot laser beam and the measurement laser beam.

In this way, in order to achieve a high accuracy, it is therefore not necessary to perform fine adjustment of the optical components before carrying out the measurement. Instead, any remaining angular deviation is initially determined and compensated for before carrying out the measurement.

If the angular deviation between the pilot laser beam and the measurement laser beam is known, the angular deviation may be compensated for by the deflection unit after alignment of the pilot laser beam with the measurement point and before carrying out the measurement. After this compensation, the measurement laser beam therefore impinges on the measurement point and the point of incidence of the pilot laser beam now deviates—depending on the existing angular deviation—from the measurement point. The vibration measurement subsequently carried out therefore takes place at the measurement point to which the pilot laser beam was initially directed.

The method according to the invention allows a significant increase in accuracy in relation to the point of incidence of the measurement laser beam on a measurement point previously selected by the pilot laser beam, without the user having to readjust optical components, such as, for example, semitransparent mirrors for coupling the pilot laser beam into the beam path of the measurement laser beam.

The apparatus according to the invention for interferometric vibration measurement at a multiplicity of measurement points using a measurement laser beam comprises one or more radiation sources for generating a measurement laser beam in the infrared wavelength range and a pilot laser beam in the visible wavelength range. The apparatus furthermore comprises a deflection unit, which is arranged in the beam path of the measurement laser beam and the pilot laser beam, as well as a control unit, which is connected to the deflection unit in order to direct the measurement laser beam and the pilot laser beam onto a multiplicity of measurement points on a measurement object.

The apparatus furthermore comprises an interferometer unit for superimposing the measurement beam at least partially reflected and/or scattered by the measurement object with a reference beam so as to form optical interference on at least one detector surface of at least one interference detector of the apparatus. The interference detector is connected to the control unit in order to evaluate vibration data.

What is essential is that the control unit is configured to direct the pilot laser beam onto a measurement point as a function of control instructions by the deflection unit, in a correction step to actuate the deflection unit in order to compensate for an angular deviation between the pilot laser beam and the measurement laser beam, and, after performing the correction step, to carry out a vibration measurement at the measurement point using the measurement laser.

In this way, the advantages described above when explaining the method according to the invention are obtained.

Advantageously, in order to determine the angular deviation, a detector, by which both a point of incidence of the pilot laser beam and a point of incidence of the measurement laser beam can be detected, is used. In this way, the angular deviation may be determined in an uncomplicated way.

Likewise, the apparatus preferably comprises a detector which is configured to detect both a point of incidence of the pilot laser beam and a point of incidence of the measurement laser beam, in order to achieve an uncomplicated structure.

When using such a detector, in order to determine the angular deviation, the detector is advantageously arranged at the location of the measurement object, or at least in the region of the measurement object, preferably directly on the measurement object between the deflection unit and the measurement object. In this way, the angular deviation is determined at least approximately according to the spatial conditions subsequently existing during the measurement.

Advantageously, in order to determine the angular deviation, a point of incidence of the pilot laser beam or of the measurement laser beam is selected as a reference point and the point of incidence of the other laser beam is tracked to the reference point by the deflection unit. In this way, the angular deviation is determined in an uncomplicated way by the required change being registered by the deflection unit during the tracking. This change carried out by the deflection unit during the tracking corresponds to the compensation required in method step B1.

In this case, in one advantageous embodiment, the pilot laser beam may initially be directed onto a reference point. Subsequently, by use of the deflection unit, the measurement laser beam is directed onto this reference point and the change required therefor, in particular the angle change by the deflection unit, is determined as the angular deviation. It is likewise within the scope of the invention to initially direct the measurement laser beam onto a reference point and to subsequently track the pilot laser beam onto the reference point by the deflection unit. In this way as well, the angular deviation is also obtained, with a contrary change, that is to say compensation by the opposite deviation, being correspondingly carried out for the compensation in method step B1.

In particular, in order to determine the angular deviation, it is advantageous to arrange a detector, by which at least the measurement laser beam can be detected, at the location of the reference point. In one advantageous configuration, such a detector is arranged at the location of the reference point and the pilot laser beam is directed onto the detector. Subsequently, the measurement laser beam is tracked onto the detector and the angular deviation is in this way determined as described above. The alignment of the pilot laser beam with the reference point is preferably carried out by one or more of the following method steps: (a) the pilot laser is directed onto the reference point by manual control of the deflection unit; (b) the region around the reference point is acquired by a camera and the pilot laser is guided to the reference point with the aid of the camera images, which may be done manually or preferably in an automated fashion; or (c) the pilot laser is guided in a grid over the region around the reference point and the detector signal is measured, the position with a maximum detector signal then corresponds to the deflection of the pilot laser onto the reference point or the grid point that lies closest to the reference point.

The tracking of the measurement laser beam may in this case be carried out in an automated fashion. In particular, it is advantageous to move the measurement beam in a grid over the detector surface by the deflection unit and to record the intensity on the photodetector as a function of the angles, or angular deviations, set by the deflection unit. From the control parameters for the deflection unit when directing the pilot laser beam onto the detector, on the one hand, and the control parameters with which the maximum intensity was acquired during the aforementioned grid movement of the measurement beam (and it may therefore be assumed that the measurement beam at least partially impinges on the detector), the angular deviation may be deduced.

In particular when using a deflection unit whose deflection behavior may be described by an angle pair, for example a deflection unit with two mirrors, the initial deflection angle pair when directing the pilot laser beam onto the detector and the angle pair with which the maximum intensity has been recorded is preferably used in order to calculate the angular deviation between the pilot and measurement laser beams.

Advantageously, the detector is configured so that it is sensitive both to the wavelength of the pilot laser and to the wavelength of the measurement laser. This makes it possible to improve the initial alignment of the pilot laser with the detector in an automated fashion by moving the pilot laser beam in a fine grid over the detector surface with the measurement laser beam turned off and recording the intensity as a function of the deflection angles. The ideal alignment of the pilot laser with the detector is achieved at the maximum intensity. When scanning the measurement laser beam, the pilot laser then needs to be turned off.

Since the mechanical superposition already ensures a good match of the directions of the pilot laser beam and of the measurement laser beam, scanning is required only in a small angular range of the residual deviation to be expected.

The apparatus according to the invention therefore preferably comprises a detector for at least the measurement laser beam. Such a detector is configured in one preferred embodiment as a photocell that is sensitive at least in the wavelength range of the measurement laser beam, preferably both in the wavelength range of the measurement laser beam and in the wavelength range of the pilot laser beam. In order to increase the accuracy, in one preferred embodiment the detector comprises a diaphragm, in particular an aperture, which therefore defines the location of the reference point.

Depending on the size of the aperture and of the diameter of the focused laser beam, instead of the angular deviation with the highest intensity, it is advantageously possible to use all angular deviations that exceed a particular intensity value, and by averaging methods, in particular by a centroid calculation, the angular deviation that may optimally be assigned to the center of the laser beam may be determined from the intensities and the associated deviations. In particular, this is advantageous when the size of the aperture and of the diameter of the focused laser beam do not coincide.

It is likewise within the scope of the invention to configure the detector as a PIN photodiode or as a locally resolving detector, preferably as a PSD detector (PSD=position-sensitive device), as a quadrant photodiode or as a CCD or CMOS camera, or as a photodiode array. Preferably, the locally resolving detector is configured to detect both the pilot laser beam and the measurement laser beam. By use of such a detector, the above-described tracking may be carried out in a straightforward way.

Advantageously, the angular deviation is determined as a function of a location difference of a point of incidence of the measurement laser beam and of a point of incidence of the pilot laser beam on a reference surface. In this advantageous embodiment, tracking of the measurement or pilot laser beam to a reference point previously defined by the other laser beam is therefore not absolutely necessary.

Advantageously, in order to determine the angular deviation, an IR converter surface, which converts the radiation of the measurement laser beam at the point of incidence into the visible wavelength range, is used.

The use of such a converter surface is advantageous since tracking as described above is possible in a straightforward way because the points of incidence both of the measurement laser beam and of the pilot laser beam are visible.

The use of such an IR converter surface is likewise advantageous in order, as described above, to use a location difference between the point of incidence of the pilot laser beam and of the measurement laser beam in order to determine the angular deviation, since the location difference may be carried out in a straightforward way by evaluating the points of incidence, which are now detectable in the visible range, of the measurement laser beam and the pilot laser beam.

Advantageously, the point of incidence of the measurement laser beam and/or of the pilot laser beam is determined by one or more locally resolved camera images. It is in this case within the scope of the invention for the user to manually specify control instructions to the deflection unit, with the aid of the camera images displayed on a display unit such as a display screen, in order to determine the angular deviation, for example in order to carry out tracking to a reference point as above or to mark the points of incidence in order to determine a location difference.

In particular, however, it is advantageous for the angular deviation to be determined in an automated fashion by evaluation of the camera image or images, so that no manual handling by the user is necessary. In a similar way to the above-described method with the aperture, a high accuracy may in this case be achieved by evaluating a plurality of neighboring camera pixels, in particular by centroid calculation of all pixels that exceed a threshold value. In particular, it is advantageous to reduce the camera sensitivity and the shutter times to such an extent that no overloading of the pixels illuminated by the laser occurs.

As an alternative, besides the camera images with laser beams, at least one camera image without laser beams is also acquired in order to determine the position of the laser beams by evaluating the difference images with and without laser beams.

The apparatus according to the invention therefore preferably comprises at least one camera and furthermore, as described above, a reference surface with an IR converter function, in order to convert the radiation of the measurement laser into the visible wavelength range at its point of incidence on the reference surface. In this way, as described above, in particular automated determination of the angular deviation may be carried out in a straightforward way. Furthermore, cameras with detection regions in the visible wavelength range are economical, have a high resolution and furthermore are already provided in many apparatuses for interferometric vibration measurement.

The control unit is preferably configured to track the point of incidence of the measurement laser beam and/or of the pilot laser beam to a reference point as a function of the camera images of the camera. In this way, the above-described tracking method for determining the angular deviation is carried out in an automated fashion.

In particular, it is advantageous for the apparatus to comprise a reference surface as described above with an IR converter function and to use this as follows in combination with a camera, in particular a video camera, of the apparatus: by image processing algorithms, the focused laser beam in the video image may be detected with sub-pixel accuracy. To this end, the camera image is darkened suitably by using short shutter times and/or small camera diaphragms so that overloading by the intense laser beam is avoided. Advantageously, the two laser beams are turned off in order to acquire a background image and then both the measurement laser and the pilot laser are switched on individually in order to respectively acquire an image with the laser beam. By difference image calculation, the images of the laser beams from which the positions can be determined with high accuracy by centroid calculation are obtained in isolation. The measurement laser beam may then repeatedly be moved slightly by the deflection unit with the pilot laser beam turned off, and the position may be re-determined after each movement by repeating the image recording and centroid calculation. From the difference of the centroids before and after the movement, the displacement vector in the camera image may be determined. By comparison of the measured displacement vector with the displacement vector required for the tracking, the movement of the deflection unit may be controlled so that the measurement laser is directed onto the previously determined position of the pilot laser. This process may be repeated iteratively until the deviation falls below a previously established limit. In other words, a control loop is therefore preferably formed for the tracking of the measurement laser. The control loop may either be configured so that all information relating to the position regulation is determined automatically during the tracking, or additional information, such as, for example, placement of the camera relative to the deflection unit, camera zoom, etc., is used in order to carry out the tracking more rapidly.

When carrying out the method according to the invention, accurate location determination of the point of incidence of the measurement laser beam and of the pilot laser beam is advantageous in order to achieve a high accuracy in the determination of the angular deviation. Advantageously, during the determination of the angular deviation, the pilot laser beam is turned off or blocked when evaluating the point of incidence of the measurement laser beam and/or the measurement laser beam is turned off or blocked when evaluating the point of incidence of the pilot laser beam. This offers the advantage that, on the one hand, no confusion takes place between the points of incidence of the pilot laser beam and the measurement laser beam. Furthermore, the determination of an angular deviation is also desirable when the points of incidence of the pilot laser beam and the measurement laser beam overlap. Particularly in such cases, determination of the two points of incidence is challenging if both laser beams are turned on and there is therefore a continuous region of the overlapping points of incidence. In this case, as described above, it is particularly advantageous to turn off the other laser beam when determining the point of incidence of a laser beam.

The angular deviation determined is preferably stored in the control unit so that, in the case of a multiplicity of subsequent measurements, it may respectively be used in method step B1 in order to compensate for the angular deviation.

In order to increase the accuracy, it is advantageous for a repeated determination of the angular deviation to be carried out and for an averaged angular deviation to be used in order to carry out the correction step B1.

The measurement laser beam has a wavelength in the infrared range of more than 700 nm, particularly preferably in the range of from 1200 nm to 1700 nm, especially preferably between 1530 nm and 1570 nm. The pilot laser beam has a wavelength in the visible range, particularly preferably in the range of from 400 nm to 700 nm, especially preferably in the range of from 500 nm to 650 nm.

The radiation sources for the measurement laser beam and/or the pilot laser beam are preferably configured as semiconductor lasers or fiber lasers.

The apparatus according to the invention and the method according to the invention are particularly suitable for measurements in which an interferometric vibration measurement is carried out by a plurality of measurement laser beams, preferably by at least two measurement laser beams, in particular by three measurement laser beams, the beam paths of which preferably do not extend parallel to one another and which furthermore preferably impinge on a common measurement point on the object to be measured.

Preferably, the interferometer unit is configured in a manner known per se in a heterodyne fashion, in particular by providing a frequency shifter in the beam path of the measurement or reference beam, preferably an acousto-optic frequency shifter (AOFS), in particular a Bragg cell.

BRIEF DESCRIPTION OF THE DRAWINGS

Further advantageous features and configurations will be explained below with the aid of exemplary embodiments and the figures, in which.

DETAILED DESCRIPTION

The figures show schematic representations that are not true to scale. In the figures, references that are the same denote elements that are the same or have the same effect.

Figure 1:
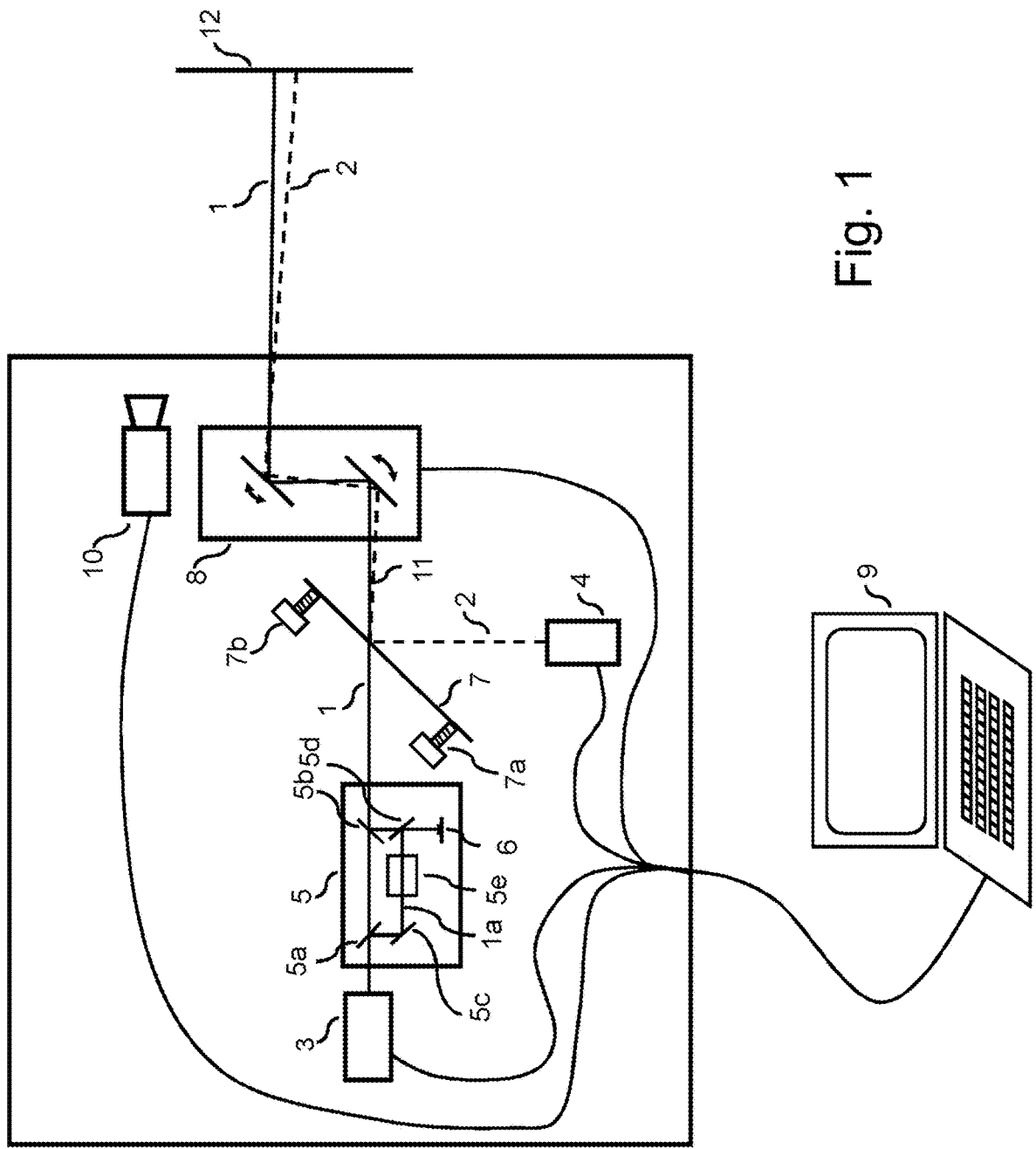
FIG. 1 shows a first exemplary embodiment of an apparatus according to the invention with an IR converter surface.

FIG. 1 shows a first exemplary embodiment of an apparatus according to the invention for interferometric vibration measurement at a multiplicity of measurement points using a measurement laser beam.

The apparatus comprises two radiation sources for generating a measurement laser beam 1 and a pilot laser beam 2: by an IR radiation source 3 which is configured as a fiber laser, a laser beam with a wavelength of 1550 nm, and therefore a wavelength in the infrared wavelength range, is generated. An interferometer unit 5 comprises a first semi-transparent mirror 5a, by which the laser beam is split into the measurement laser beam 1 and a reference laser beam 1a. The measurement laser beam 1 at least partially reflected and/or scattered by the measurement object is guided by a semitransparent mirror 5b of the interferometer unit 5 onto a detector surface of a detector 6. The reference laser beam 1a is superimposed by a mirror 5c and a semitransparent mirror 5d of the interferometer unit 5 on the detector surface of the detector 6 with the measurement laser beam 1 reflected and/or scattered by the object, in order to form optical interference.

The apparatus furthermore comprises a pilot radiation source 4, which in the present case is configured as a diode laser and generates a laser beam with a wavelength of 520 nm, and therefore a wavelength in the visible wavelength range. The pilot laser beam 2 is coupled by a coupling mirror 7 into the beam path of the measurement laser beam 1. The mirror 7 may likewise be configured as a semitransparent mirror, although in this specific case it is particularly preferably configured as a dichroic mirror that reflects the visible light of the pilot laser and transmits the infrared light of the measurement laser.

The measurement laser beam 1 and the pilot laser beam 2 are deflected by a common deflection unit 8 in order to be directed onto measurement points of the object to be measured.

The apparatus furthermore comprises a control unit 9, configured in the present case as a computer, which is connected to the deflection unit 8, the pilot radiation source 4, the interference detector 6 and the IR radiation source 3. By use of the control unit, it is therefore possible to control not only the deflection unit 8. The radiation sources may likewise be controlled, in particular turned on and off. The control unit 9 is furthermore used as an evaluation unit in order to evaluate vibration data from the measurement data of the interference detector 6.

The interferometer unit 5 is configured in a manner known per se as a heterodyne interferometer unit by providing a frequency shifter, preferably an acousto-optic frequency shifter (AOFS), in the present case a Bragg cell, in the beam path of the reference beam.

The apparatus furthermore comprises a camera 10 for compiling locally resolved camera images of the measurement environment. The camera 10 is likewise connected to the control unit 9, so that the images of the camera 10 can may be evaluated by the control unit 9.

The coupling mirror 7 comprises setting screws, which are schematically represented as adjustment elements 7a and 7b. By use of the adjustment elements 7a and 7b, fine adjustment is carried out by the manufacturer in order to guide the two laser beams coaxially and in parallel after coupling of the pilot laser beam 2 into the beam path of the measurement laser beam 1. This is not exactly possible under real conditions, however, and an—albeit slight— angular deviation always remains between the pilot laser beam 2 and the measurement laser beam 1. This angular deviation 11 is shown very exaggeratedly in the figures for reasons of better representability.

The effect of the angular deviation 11 is that the pilot laser beam 2 and the measurement laser beam 1 impinge on mutually different location points on the measurement object.

The deflection unit 8 is configured in a manner known per se and comprises mirrors rotatable about two axes. This may be achieved by one mirror rotatable about two axes. In the present case, the deflection unit comprises two mirrors respectively rotatable around one axis. This deflection unit is configured as a galvanometer scanner unit. The deflection is carried out in the present case by two mirrors, the setting of which may respectively be specified by an angle. A particular deflection setting of the galvanometer scanner unit may therefore be described by a deflection angle pair.

What is essential is that the control unit 9 is configured to direct the pilot laser beam 2 as a function of control instructions by the deflection unit 8 onto a measurement point of an object to be measured, in a correction step to actuate the deflection unit 8 in order to compensate for an angular deviation between the pilot laser beam and the measurement laser beam 1, and, after performing the correction step, to carry out a vibration measurement at the measurement point using the measurement laser beam. This will be explained in more detail below with the aid of an exemplary embodiment of a method according to the invention and FIG. 2:

The apparatus according to FIG. 1 furthermore comprises a detector, by which both a point of incidence of the pilot laser beam 2 and a point of incidence of the measurement laser beam 1 can be detected. This detector is configured in the present case as an IR converter surface 12. The IR converter surface known per se has the property that the pilot laser beam 2 is reflected or scattered without changing the wavelength, but the measurement laser beam 1, on the other hand, experiences a change in wavelength and is sent back in the present case with a wavelength of about 550 nm, and therefore a wavelength in the visible wavelength range. Using the camera 10, it is therefore possible to register both the point of incidence of the pilot laser beam 2 and the point of incidence of the measurement laser beam 1 on the IR converter surface 12.

Figure 2:
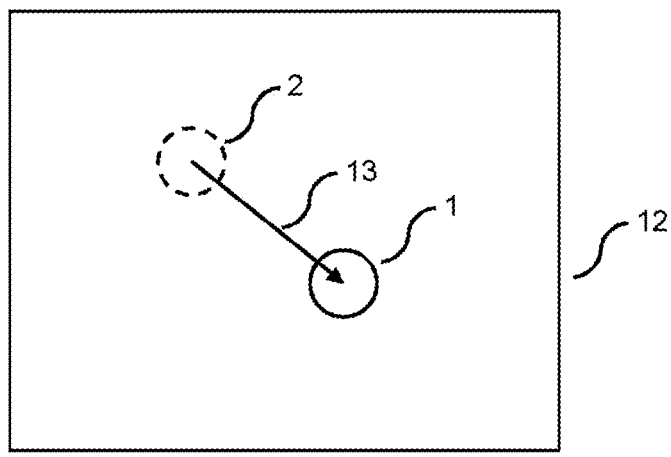
FIG. 2 shows a plan view of an IR converter surface in order to illustrate a tracking method.

FIG. 2 schematically represents a plan view of the IR converter card 12 with the point of incidence of the pilot laser beam 2 represented by dashes and the point of incidence of the measurement laser beam 1 represented by a solid circular line. As explained above, the points of incidence differ from one another because of the angular deviation 11, so that there is a location difference of the points of incidence on the IR converter surface.

In order to determine the angular deviation in the exemplary embodiment of a method according to the invention currently being described, initially only the pilot radiation source 4 is turned on by the control unit 9, while the IR radiation source 3 is not. Subsequently, a locally resolved image is acquired by the camera 10. By evaluation methods known per se, the area represented as a circular line in FIG. 2, which indicates the point of incidence of the pilot laser 2, may be determined. The midpoint of this area is assumed to be the impingement location.

Subsequently, the pilot radiation source 4 is turned off and the IR radiation source 3 is turned on. Because of the above-described property of the IR converter surface, the area illuminated by the measurement laser beam 1 may now also be determined by the camera 10 and the center of this area may be assigned as a point of incidence to the measurement laser beam 1.

The camera 10 of the apparatus according to the first exemplary embodiment is a calibrated camera with which a location difference may be assigned directly to an angular deviation. This calibration of the camera may be carried out by aligning the laser with at least 3 points of a surface by the deflection unit, the 3 points having at least one known angular placement with respect to the camera and a camera pixel respectively being assigned to the deflection angle pair. The 3 points must span a plane, i.e. not be collinear. The assignment between the deflection angle pair and the camera pixel may be carried out manually or by automatically finding the laser beam in the camera image. Preferably, the calibration is carried out directly on the IR converter surface and errors due to a change in distance are then eliminated. Preferably, the camera is very close to the points of rotation of the deflection unit, or the light intended for it is even coupled out from the beam path of the measurement or pilot laser beam by a semitransparent or dichroic mirror, in order to minimize or even entirely avoid a parallax effect that reduces the accuracy of the angle measurements.

Because of this calibration, the location difference 13 between the points of incidence of the pilot laser beam 2 and of the measurement laser beam 1 may therefore be recalculated by the control unit 9 directly as an angular deviation and likewise converted into control instructions that are sent to the deflection unit 8 in order to guide the measurement laser beam 1 onto the point of incidence, represented as a dashed circular line, of the pilot laser beam 2.

The user is therefore requested by the control unit (for example by a text prompt on a display screen) to arrange the IR converter surface approximately at the location where the measurement object is placed during the subsequent measurement. Subsequently, the user will direct the pilot laser beam by manual control instructions to the control unit (while the measurement laser beam is turned off) onto a point of the converter card and confirm this by a user input. The control unit then carries out an automatic determination of the angular deviation:

To this end—as described above—the point of incidence of the pilot laser beam 2 is registered by the camera 10 with the measurement laser beam turned off. Subsequently (without changing the mirror settings of the deflection unit 8), the pilot laser beam 2 is turned off and the measurement laser beam is turned on. By the camera 10—as likewise described above—the point of incidence of the measurement laser beam 1 is then determined. By comparison of the two camera images, it is possible to calculate the location difference and from this the angular deviation 11. The angular deviation is stored.

Preferably, the determination of the angular deviation—as described above—is carried out several times at a plurality of slightly different points on the IR converter card, in order to determine a more accurate value of the location difference (13) by averaging of the angular deviations determined.

The user is then informed by the display screen that the measurement may begin.

The user may then, for example, remove the IR converter surface 12, arrange a measurement object at the position of the latter and optionally, by further control instructions, direct the pilot laser beam 2 (now turned on) onto the desired measurement point by the deflection unit 8. After confirmation by the user, the apparatus carries out a vibration measurement. In this case, however, the angular deviation between the pilot laser beam 2 and the measurement laser beam 1 is initially compensated for:

In a method step B1, before carrying out the vibration measurement, the deflection unit 8 is controlled by the control unit 9 so that the location difference 13 is compensated for and the measurement laser beam 1 then, after carrying out correction step B1, impinges on the location represented as a dashed circular line in FIG. 2, and therefore on the location that the user previously selected as a measurement point by the pilot laser beam 2.

Subsequently, in a method step C, the vibration measurement is carried out in a manner known per se.

As mentioned in the introduction, such an apparatus is particularly suitable for carrying out a measurement on the measurement object at a multiplicity of measurement points, and in particular also for calculating in-plane or 3D vibrations with the aid of the multiplicity of vibration measurements.

Figure 3:
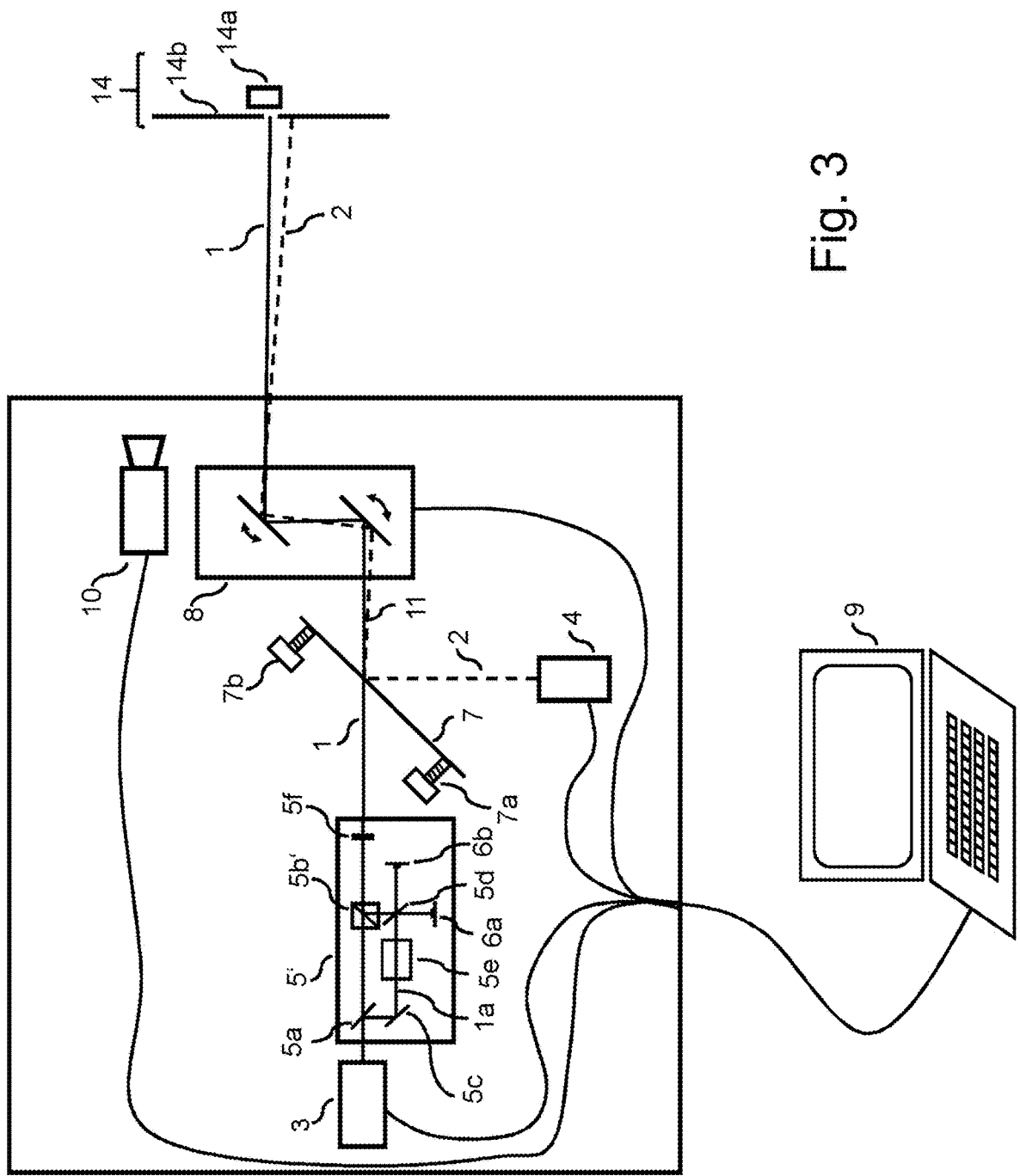
FIG. 3 shows a second exemplary embodiment of an apparatus according to the invention with a detector having an aperture.

FIG. 3 schematically represents a second exemplary embodiment of an apparatus according to the invention.

The apparatus is configured so as to be substantially identical to the apparatus according to the first exemplary embodiment and the representation in FIG. 1. In order to avoid repetition, only the essential differences will therefore be discussed below:

The IR radiation source 3 generates a linearly polarized laser beam. Correspondingly, the beam splitter 5b' is configured as a PBS (polarizing beam splitter). The PBS 5b' interacts with a lambda/4 plate 5f, which in the present case is arranged in the beam path of the measurement beam 1. In this way, for the returning measurement beam, the polarization is modified in such a way that this beam is deflected downward at the PBS 5b' toward the semitransparent mirror 5d.

Furthermore, the interference detector of the apparatus according to FIG. 3 is configured as an interference detector in the balanced detector configuration known per se: the detector comprises two partial interference detectors 6a and 6b, which are connected to the control unit 9 in order to evaluate the measurement data according to the principle of balanced detectors. Via the semitransparent mirror 5d, fractions of the returning measurement beam and of the reference beam respectively arrive at each of the partial interference detectors 6a and 6b.

The interferometer 5' also has a heterodyne structure with an AOFS 5e configured as a Bragg cell.

The configuration of the interferometer with a PBS, a lambda/4 plate and the balanced detectors may, in an alternative exemplary embodiment, also be produced in the apparatus according to FIG. 1.

The apparatus according to the second exemplary embodiment comprises, as represented in FIG. 3, a laser beam detector 14. The laser beam detector 14 comprises a photodiode 14a and an aperture 14b. In order to carry out the determination of the angular deviations, the user is then requested to arrange the laser beam detector approximately at the location where the measurement object is placed during the subsequent measurement and to direct the pilot laser beam 2 (visible to the user) onto the opening of the aperture 14b by the deflection unit 8.

The photodiode 14a is configured in the present case as a PIN diode. By use of the photodiode 14a, it is therefore possible to detect both the measurement laser beam 1 and the pilot laser beam 2.

Figure 4:
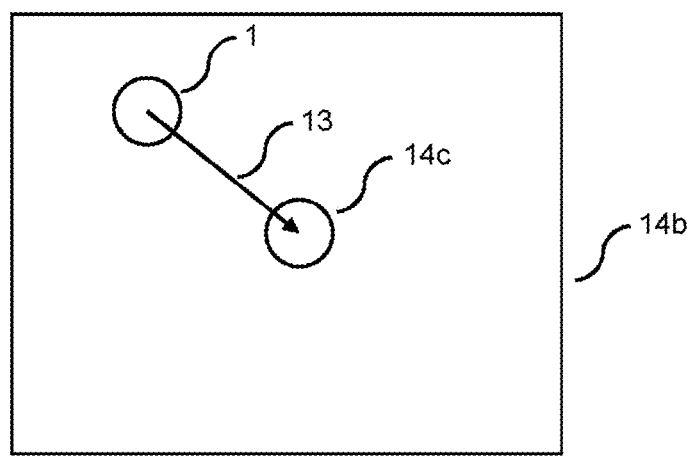
FIG. 4 shows a plan view of the aperture in order to illustrate the tracking method.

As soon as impingement of the pilot laser beam 2 is detected by the control unit 9, which is connected to the photodiode 14a, the pilot laser beam 2 is turned off and the measurement laser beam 1 (not visible to the user) is turned on. Because of the angular deviation 11, however, in this situation the measurement laser beam 1 will generally not impinge on the opening 14c of the aperture 14b and therefore also not impinge on the photodiode 14a. This is represented in FIG. 4: the point of incidence, represented as a circle, of the measurement laser beam 1 has a location difference 13 from the opening 14c of the aperture 14b. When using a PIN diode, the aperture 14b may be omitted and the opening 14c of the aperture corresponds to the active area of the PIN diode.

The control unit then automatically tracks the measurement laser beam 1 using the deflection unit 8 until it impinges on the opening of the aperture 14b and therefore impinges on the photodiode 14a. To this end, the measurement laser beam is scanned in a small angular range, the intensity of the photodiode is recorded and the deflection unit is adjusted to the angle pair for which the intensity of the photodiode is maximal. Because of the angular deviation 11, the beam path of the pilot laser beam 2, if it is turned on again, will then not end at the opening of the aperture 14b. This state after tracking of the measurement laser beam 1 is shown in FIG. 3.

The required changes in the angle settings of the deflection unit 8 from the above-described tracking of the measurement laser beam 1 give the angular deviation 11, which is stored for the further measurements.

It is then signaled to the user that the determination of the angular deviation is completed.

The user may then remove the detector with the aperture 14b and the photodiode 14a, arrange a measurement object instead of them, and specify one or a multiplicity of measurement points on the object by the control unit by the deflection unit 8 and using the pilot laser beam 2.

The measurement is then carried out as described above: in order to carry out a measurement at a measurement point specified by the user by approaching it using the pilot laser beam 2, before carrying out the measurement a compensation is carried out in a method step B1 by compensating for the previously determined angular deviation, so that, after carrying out the correction step B1, although the pilot laser beam 2 does not impinge on the specified measurement point, the measurement laser beam 1 does. Subsequently, the vibration measurement is carried out in a manner known per se.

Figure 5A:
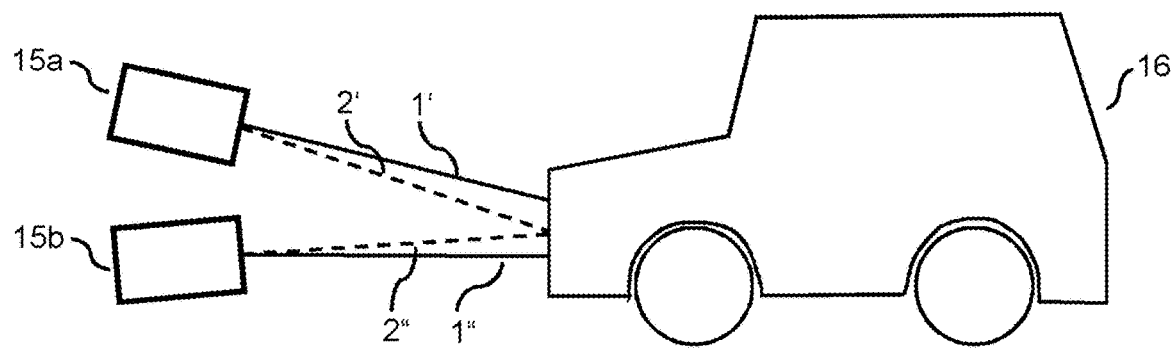
FIGS. 5A and 5B show schematic representations in embodiments of an exemplary embodiment of the method according to the invention with the use of two measurement heads.
Figure 5B:
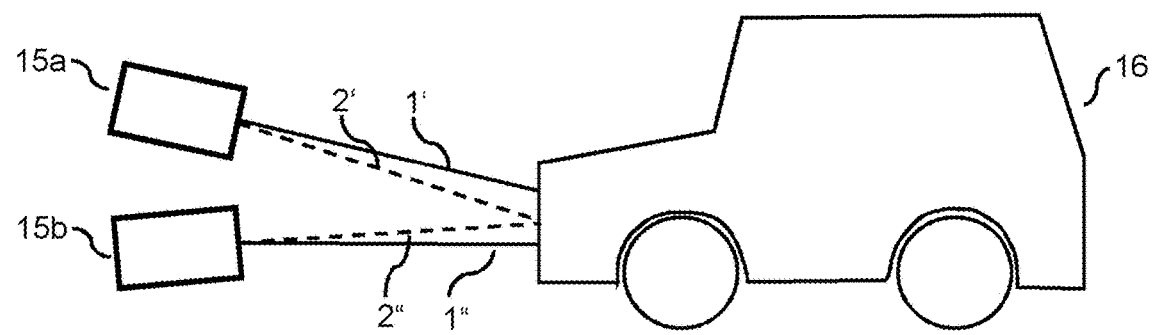

FIGS. 5A and 5B schematically show an application of a plurality of apparatuses according to FIG. 1 for carrying out three-dimensional vibration measurements:

Two measurement heads 15a and 15b are used, which are arranged in order to measure a common measurement point on a measurement object 16 (in the present case an automobile). Initially, the respective angular deviation is determined and stored as described above for each measurement head by the IR converter surface 12.

Subsequently, by use of the pilot laser beams 2' of the first measurement head and 2" of the second measurement head, a common measurement point on the measurement object 16, on which both pilot laser beams 2' and 2" impinge, is selected.

As represented in FIGS. 5A and 5B, however, because of the angular deviations of the measurement heads 15a and 15b, the measurement laser beams 1' and 1" of the measurement heads do not impinge on a common point on the measurement object 16. This is schematically represented in FIG. 5A.

For each of the measurement heads 15a and 15b, a correction step B1, in which the previously determined angular deviation is corrected respectively by the deflection unit of the measurement heads, is therefore performed by carrying out the measurement. The state after carrying out the correction steps is represented in FIG. 5B:

Because of the correction steps, the measurement laser beams 1' and 1" then impinge on the measurement point, previously marked by the pilot laser beams, on the measurement object 16.

LIST OF REFERENCES 1 measurement laser beam
1a reference laser beam
2 pilot laser beam
3 IR radiation source
4 pilot radiation source
5, 5' interferometer unit
5a, 5b, 5d semitransparent mirror
5b' PBS (polarizing beam splitter)
5c mirror
5e AOFS (acousto-optic frequency shifter)
5f lambda/4 plate
6, 6a, 6b interference detector
7 coupling mirror
7a, 7b adjustment elements
8 deflection unit
9 control unit
10 camera
11 angular deviation
12 IR converter surface
13 location difference
14 laser beam detector
14a photodiode
14b aperture
14c opening of the aperture
15a, 15b measurement heads
16 measurement object

The invention claimed is:

1. A method for interferometric vibration measurement at a multiplicity of measurement points using a measurement laser beam (1),
the method comprising the steps of
A. generating the measurement laser beam (1) with a wavelength in an infrared wavelength range and a pilot laser beam (2) with a wavelength in a visible wavelength range;
B. after step A, deflecting the measurement laser beam (1) and the pilot laser beam (2) by a common optical deflection unit (8), and controlling the common optical deflection unit (8) so that the pilot laser beam (2) impinges on the measurement point; and
C. after step B, carrying out a vibration measurement using the measurement laser beam (1);
determining an angular deviation (11) between the pilot laser beam (2) and the measurement laser beam (1); and
in a correction step B1 between method steps B and C and after step B, actuating the common optical deflection unit (8) in order to compensate for the angular deviation (11) between the pilot laser beam (2) and the measurement laser beam (1) so that the measurement laser beam (1) impinges on the measurement point and the point of incidence of the pilot laser beam deviates, depending on the angular deviation, from the measurement point.

2. The method as claimed in claim 1, further comprising, in order to determine the angular deviation (11), using a detector, by which both a point of incidence of the pilot laser beam (2) and a point of incidence of the measurement laser beam (1) are detected.

3. The method as claimed in claim 1, further comprising in order to determine the angular deviation (11), selecting a point of incidence of the pilot laser beam (2) or of the measurement laser beam (1) as a reference point and tracking the point of incidence of the other laser beam to the reference point by the deflection unit (8).

4. The method as claimed in claim 3, further comprising in order to determine the angular deviation (11), arranging a detector, by which at least the measurement laser beam (1) is detectable, at the location of the reference point.

5. The method as claimed in claim 1, further comprising determining the angular deviation (11) as a function of a location difference of a point of incidence of the pilot laser beam (2) and of a point of incidence of the measurement laser beam (1) on a reference surface.

6. The method as claimed in claim 1, further comprising, in order to determine the angular deviation (11), using an IR converter surface (12), which converts radiation of the measurement laser beam at a point of incidence into the visible wavelength range.

7. The method as claimed in claim 1, wherein a point of incidence of at least one of the measurement laser beam (1) or pilot laser beam (2) is determined by one or more locally resolved camera images, and the angular deviation (11) is determined in an automated fashion by evaluation of the camera image or images.

8. The method as claimed in claim 1, further comprising, during the determination of the angular deviation (11), at least one of turning off or blocking the pilot laser beam (2) when evaluating a point of incidence of the measurement laser beam (1) or turning off or blocking the measurement laser beam (1) when evaluating a point of incidence of the pilot laser beam (2).

9. The method as claimed in claim 1, wherein the angular deviation (11) is stored in the control unit (9).

10. The method as claimed in claim 1, further comprising carrying out a repeated determination of the angular deviation (11), and using an averaged angular deviation (11) in order to carry out the correction step B1.

11. An apparatus for interferometric vibration measurement at a multiplicity of measurement points using a measurement laser beam (1), the apparatus comprising:
one or more radiation sources configured for generating a measurement laser beam (1) in an infrared wavelength range and a pilot laser beam (2) in a visible wavelength range,
a common deflection unit (8) arranged in the beam path of the measurement laser beam (1) and the pilot laser beam (2),
a control unit (9) connected to the deflection unit (8) in order to direct the measurement laser beam (1) and the pilot laser beam (2) onto a multiplicity of measurement points on a measurement object (16), an interferometer unit (5, 5') configured to superimpose the measurement beam at least partially reflected and/or scattered by the measurement object (16) with a reference beam to form optical interference on a detector surface of an interference detector (6) of the apparatus, the interference detector (6) being connected to the control unit (9) in order to evaluate vibration data, wherein for carrying out a vibration measurement, the control unit (9) is configured to direct the pilot laser beam (2) onto a measurement point as a function of control instructions by the common deflection unit (8), in a correction step after directing the pilot laser beam (2) onto the measurement point, is configured to actuate the common deflection unit (8) in order to compensate for an angular deviation (11) between the pilot laser beam (2) and the measurement laser beam (1), and, after performing the correction step, is further configured to carry out the vibration measurement at the measurement point using the measurement laser beam (1) that is corrected by the correction step to impinge on the measurement point, while the point of incidence of the pilot laser beam deviates, depending on the angular deviation, from the measurement point.

12. The apparatus as claimed in claim 11, further comprising a detector configured to detect both a point of incidence of the pilot laser beam (2) and a point of incidence of the measurement laser beam (1).

13. The apparatus as claimed in claim 11, further comprising a detector for the measurement laser beam (1).

14. The apparatus as claimed in claim 11, further comprising at least one camera (10), and a reference surface with an IR converter function, in order to convert radiation of the measurement laser beam (1) into the visible wavelength range at a point of incidence thereof on the reference surface.

15. The apparatus as claimed in claim 14, wherein the control unit (9) is configured to track the point of incidence of at least one of the measurement laser beam (1) or the pilot laser beam (2) to a reference point as a function of camera images of the camera (10).

* * * * *